(12) United States Patent
Nabet

(10) Patent No.: US 9,764,791 B2
(45) Date of Patent: Sep. 19, 2017

(54) LOCKING MECHANISM FOR BICYCLES

(71) Applicant: Reuven Nabet, Natanya (IL)

(72) Inventor: Reuven Nabet, Natanya (IL)

( * ) Notice: Subject to any disclaimer, the term of this patent is extended or adjusted under 35 U.S.C. 154(b) by 0 days.

(21) Appl. No.: 15/124,034

(22) PCT Filed: Apr. 13, 2015

(86) PCT No.: PCT/IL2015/050395
§ 371 (c)(1),
(2) Date: Sep. 7, 2016

(87) PCT Pub. No.: WO2016/166742
PCT Pub. Date: Oct. 20, 2016

(65) Prior Publication Data
US 2017/0073033 A1 Mar. 16, 2017

(30) Foreign Application Priority Data

Apr. 13, 2014 (IL) .......................................... 232132

(51) Int. Cl.
*B62K 19/18* (2006.01)

(52) U.S. Cl.
CPC .......... *B62K 19/18* (2013.01); *B62K 2206/00* (2013.01)

(58) Field of Classification Search
CPC .. B62K 2206/00; B62K 19/18; B60B 27/026; B60B 1/042; E05B 13/10
USPC ............................................ 70/19, 225, 226
See application file for complete search history.

(56) References Cited

U.S. PATENT DOCUMENTS

| | | | | |
|---|---|---|---|---|
| 4,724,692 A * | 2/1988 | Turin | ..................... | B62H 5/001 70/204 |
| 5,027,628 A * | 7/1991 | De Rocher | ............ | B62H 5/001 70/225 |
| 5,479,836 A | 1/1996 | Chang | | |
| 5,526,661 A * | 6/1996 | Lin | ........................ | B62H 5/001 301/110.5 |
| 5,813,258 A * | 9/1998 | Cova | ...................... | B62K 25/02 301/124.2 |
| 6,408,659 B1 * | 6/2002 | Chang | ................... | E05C 19/007 70/19 |
| 6,758,380 B1 * | 7/2004 | Kolda | ..................... | B60R 9/048 224/315 |
| 6,948,878 B1 | 9/2005 | Smith, Jr. et al. | | |
| 8,281,625 B2 * | 10/2012 | Prescott | ................. | B60R 9/048 211/5 |

(Continued)

FOREIGN PATENT DOCUMENTS

CN 101549735 A * 10/2009
ES WO 2009065973 A1 * 5/2009 ............. B62H 5/001

*Primary Examiner* — Suzanne Barrett

(57) ABSTRACT

A quick release mechanism for bicycle parts that comprises a locking mechanism and a rod. The locking mechanism comprises a fixed locking core and a rotating housing handle. One end of said rod is attached to the fixed locking core. Said rotating housing handle has a ring-shaped base with two rings separated by an inner cavity. The inner side of said ring-shaped base has several punctures in it. Said rotating housing handle has locking pins designed to be inserted into said punctures in said inner side of said ring-shaped base of the rotating housing handle. Said locking pins are designed to be inserted into said fixed locking core. Said rotating housing handle serves both as a rotating housing of said locking mechanism and as a handle of said quick release mechanism.

2 Claims, 3 Drawing Sheets

(56) References Cited

U.S. PATENT DOCUMENTS

| | | | |
|---|---|---|---|
| 9,120,349 B2* | 9/2015 | Chang ................... | B60B 27/026 |
| 2015/0144009 A1* | 5/2015 | Schlanger ............... | B60B 1/003 |
| | | | 99/421 R |
| 2016/0159427 A1* | 6/2016 | Schlanger .............. | B62K 25/02 |
| | | | 301/124.2 |

* cited by examiner

LOCKING MECHANISM FOR BICYCLES

RELATED APPLICATIONS

This application is a National Phase of PCT Patent Application No. PCT/IL2015/050496 having International filing date of 13 Apr. 2015, which claims the benefit of priority of IL Patent Application No. 232132 filed on 13 Apr. 2014. The contents of the above applications are all incorporated by reference as if fully set forth herein in their entirety.

Technical Field

The present invention refers to a quick release mechanism for bicycles that includes a locking mechanism.

BACKGROUND ART

It is customary to attach and tighten bicycle seats and wheels using quick release mechanisms. Drawing No. 1 depicts a standard quick release mechanism (100) for a bicycle seat and Drawing No. 2 depicts a standard quick release mechanism (200) for a bicycle wheel. It is also customary to lock bicycle parts, such as seat and wheels, to prevent their theft while the bicycle itself is locked. The main objective of the present invention is to provide a quick release mechanism for attaching and tightening bicycle seats or wheels that includes an effective, built-in, inner locking mechanism that prevents the quick release mechanism from being opened without an appropriate key.

U.S. Pat. No. 5,479,836 (hereinafter Patent 836) describes a quick release mechanism for a bicycle. The quick release mechanism of Patent 836 comprises, inter alia, a handle and a locking device. The locking device of Patent 836 includes a lock housing and a rotatable core. The rotatable core is located in the hollow interior of the lock housing. This typical quick release mechanism includes a rod, to which the standard clamp is attached.

The locking device of Patent 836 is based on locking pins and, therefore, by nature, it includes two parts that rotate relative to one another. As mentioned, the locking device of Patent 836 includes a lock housing, which is permanently affixed to the rod, and a rotatable core, which rotates relative to the lock housing. In addition to these two parts of the locking device of Patent 836, the quick release mechanism further includes a handle. The present invention provides a quick release mechanism wherein the handle itself serves as a part of the locking mechanism, thus making it easier and cheaper to manufacture.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1:
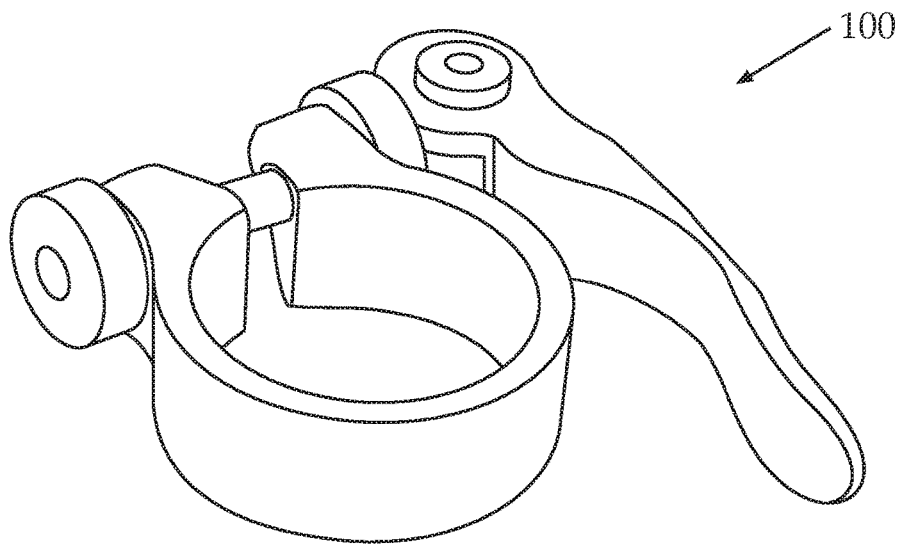
FIG. 1 depicts a standard quick release mechanism (100) for a bicycle seat.
Figure 2:
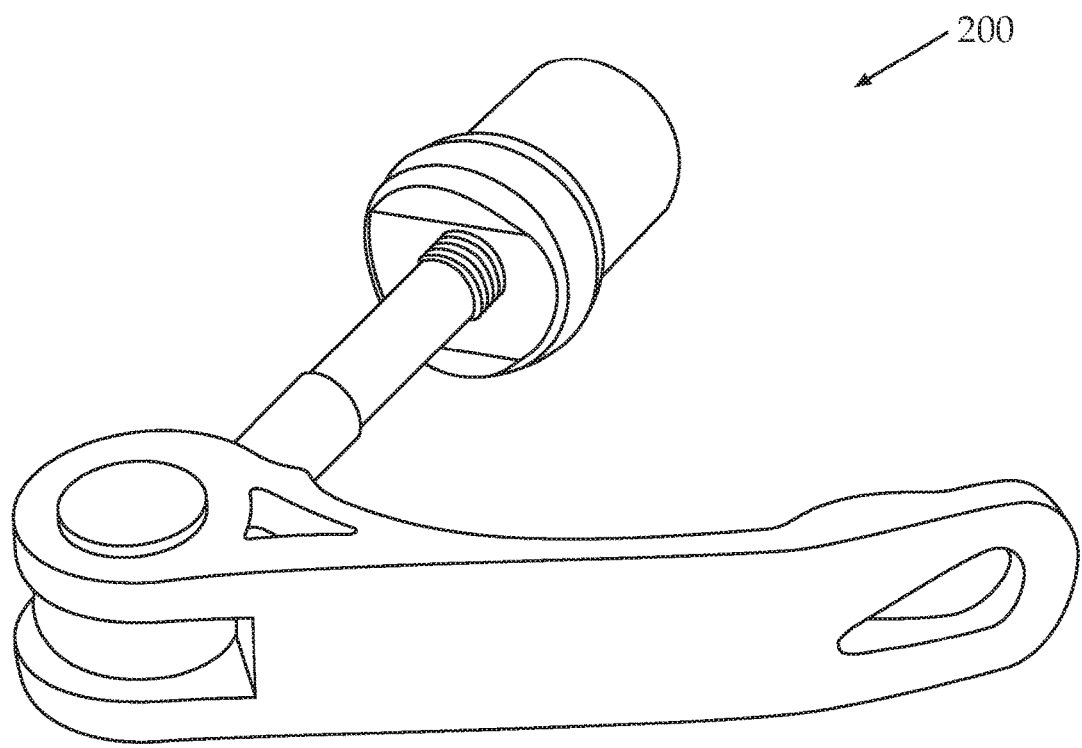
FIG. 2 depicts a standard quick release mechanism (200) for a bicycle wheel.
Figure 3:
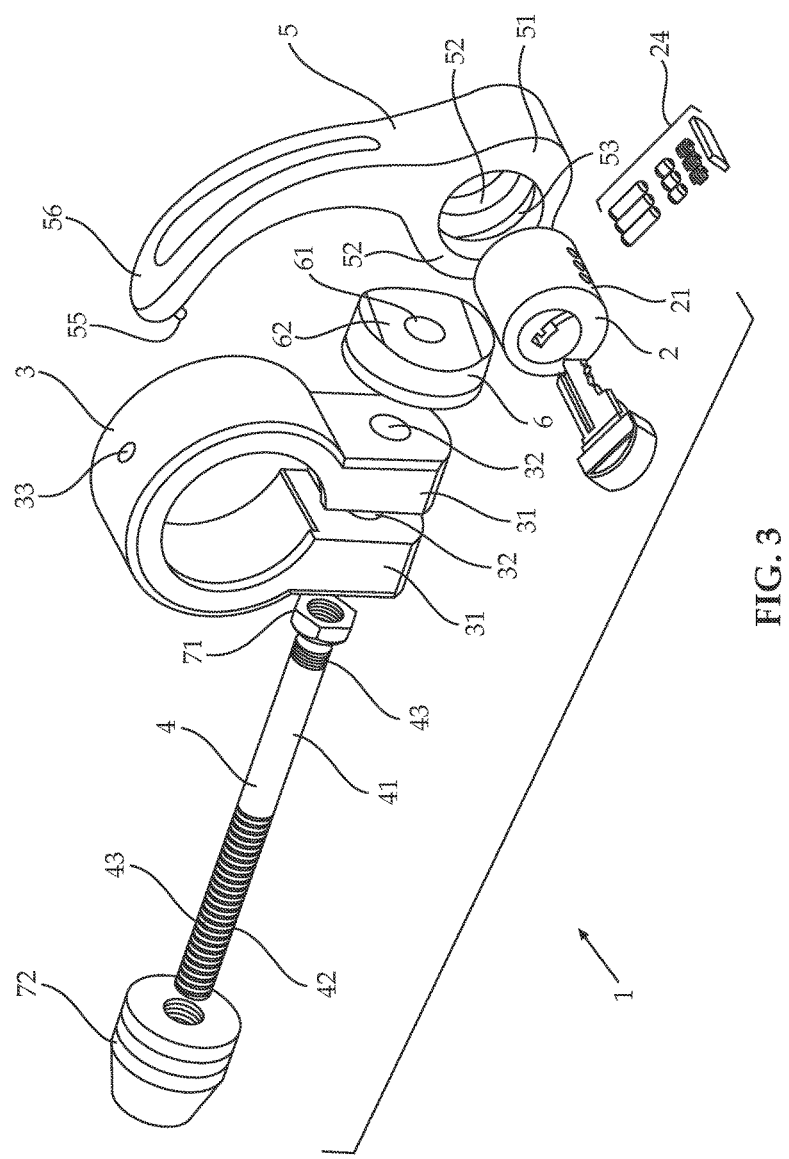
FIG. 3 depicts a quick release mechanism (1) that comprises a clamp (3), a rod (4), a rotating housing handle (5), a pad (6), a nut (71), and fixed locking core (2).
Figure 4:
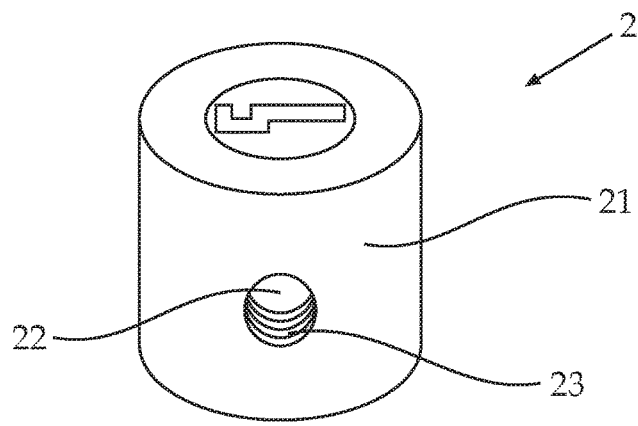
FIG. 4 depicts the fixed locking core (2) that has a hole-like depression (22) with an internal thread (23).
Figure 5:
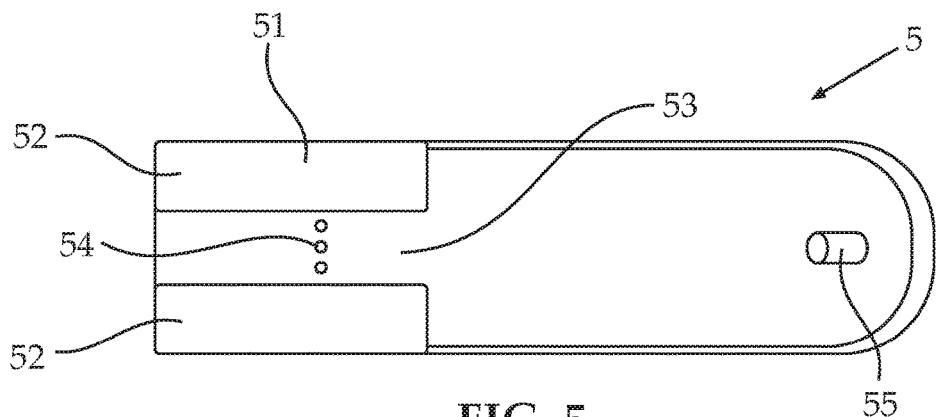
FIG. 5 depicts the rotating housing handle (5) and the punctures (54) in the side of its inner cavity (53).
Figure 6:
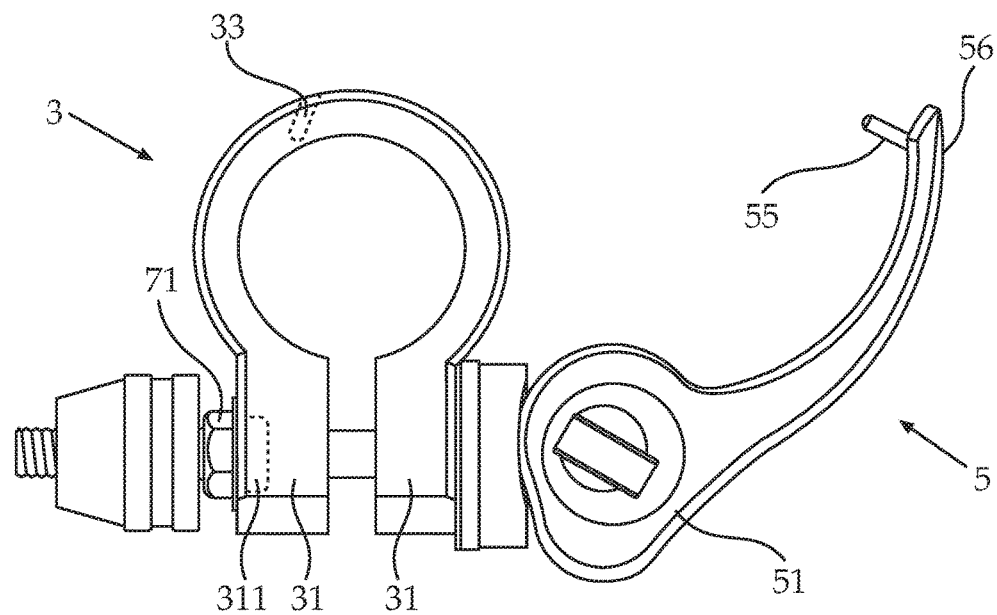
FIG. 6 depicts the mechanism (1) that includes a pin (55) on the rotating housing handle (5) and a corresponding hole (33) in the clamp (3).

The main objective of the present invention is to provide a quick release mechanism (1) for a bicycle seat or wheel that has a built-in locking mechanism. Another objective of the present invention is to provide a quick release mechanism (1) as mentioned, whereby the locking mechanism is simple and effective, is connected to the mechanism components, and is locked together with the mechanism components in a simple and effective manner.

The quick release mechanism (1), subject of the present invention, includes the following components: a clamp (3), a rod (4), a pad (6), a nut (71), and a locking mechanism wherein said locking mechanism comprises two parts: a fixed locking core (2) and a rotating housing handle (5). The quick release mechanism (1) is depicted in Drawing No. 3 along with its components, which are familiar to any average professional in the field and will therefore be described only in a general manner.

The clamp (3) is omega-shaped (an almost closed circle) and has parallel, flanged ends (31) with holes (32) through them, as depicted in Drawing No. 3. The rod (4) has an external thread (43) on both ends (41) (42). The pad (6) is of standard design and it has a hole (61) through it and a depression (62). The nut (71) is designed to limit the movement of the flanges (31).

The locking mechanism comprises said rotating housing handle (5) and said fixed locking core (2): One of the innovative aspects of the mechanism (1) lies in the way the rotating housing handle (5) and fixed locking core (2) are designed and integrated. The rotating housing handle (5) has a ring-shaped base (51) with two parallel rings (52) and a cavity (53) between them. The inner side of the ring-shaped base (51) has several punctures (54) in it. The locking mechanism comprises a fixed locking core (2) with a hole-like depression (22) in its side, which has an inner thread (23) AND said rotating handle (5). When the key is inserted into the fixed locking core (2), the locking pins (24) are extracted and the user may turn the rotating housing handle and open the mechanism, and vice versa. Drawing No. 4 depicts the fixed locking core (2) with the hole-like depression (22) and inner thread (23). Drawing No. 5 depicts the rotating housing handle (5) and the punctures (54) in the inner side of the ring-shaped base (51).

The flange (31) facing the nut (71) may have a depression (311) the same shape as the nut (71), so that when the mechanism is locked, the nut (71) is sunken in the depression (311) in a way that prevents access to it and prevents using a wrench to open it. The mechanism may also be equipped with a second nut (72) that enables the user to mount additional accessories on the mechanism, such as a bicycle rack. In such a case, the relevant flanges of the accessory are be attached as follows: one flange is attached between the pad (6) and the clamp (3) and the second flange is attached between the second nut (72) and the nut (71)

Assembly of mechanism (1) and method of operation: The mechanism (1), subject of the present invention, is assembled in the same general way that standard mechanisms, as depicted in Drawings Nos. 1 and 2, are assembled. The differences between the mechanism (1), subject of the present invention, and standard mechanisms such as the one which described in Patent 836, lie, among other things, in the following aspects: (a) The rod (4) is attached to the fixed locking core (2) whereby its front end (41) is screwed into the hole-like depression (22) in the fixed locking core (2). Thus, no special mechanisms or means are required to attach the locking mechanism (2+5) requires to said rod. (b) The locking mechanism (2+5) comprises in fact one single unit that is the fixed locking core (2), and the rotating housing handle (5) combined.

The fixed locking core (2) can be inserted simply and easily into the inner cavity (53) of the rotating housing handle (5). The rotating housing handle (5) is constructed and, in fact, functions both as a rotating housing for the locking mechanism and as a handle. (c) The locking pins (24) are inserted into the punctures (54) in the rotating housing handle (5) and effectively lock the rotating housing handle (5) using the fixed locking core (2), while the key may be used to unlock the lock. The rod (4) may, of course, be attached to the fixed locking core (2) using any other kind of joining means, including welding, etc.

Another version of the mechanism (1) includes a pin (55) at the free end (56) of the rotating housing handle (5) a corresponding hole (33) in the clamp (3) so that when the mechanism (1) is affixed to the relevant accessory, the pin (55) is inserted into the hole (33), preventing the free end (56) of the rotating housing handle (5) from being inserted into a hollow rod and used as a lever to lift the rotating housing handle (5) and break the lock. Drawing No. 6 depicts the mechanism (1) with a pin (55) on the rotating housing handle (5) and a hole (33) in the clamp (3).

The mechanism (1), subject of the present invention, can in fact comprise the rotating housing handle (5), which contains the fixed locking core (2), to which the rod (4) is attached. The user may already have a clamp, a pad and nuts as part of his or her bicycle components. Obviously, the length of the rod (4) will vary according to the bicycle part it is used to lock, i.e. the bicycle seat, a bicycle wheel, or other bicycle parts.

It is clearly understood from the above explanations and the figures that the fixed locking core (2) includes the keyhole to which the key should be inserted for opening the locking mechanisms. In addition, it is also clearly understood that the punctures (54) are on the inner side of the ring-shaped base (51) and that these punctures (54) ended inside the ring-shaped base (51) itself, means that they are invisible through the outer wall of the ring-shaped base (51). It is also understood that the holes on the fixed locking core (2) that are designed to receive the locking pins (24) are located opposite to the hole-like depression (22) to which the rod (4) is connected. The term "opposite" here and in the claims means opposite with deflection of up to 30 degrees to each direction.

What is claimed is:

1. A quick release mechanism for bicycle parts that comprises a locking mechanism and a rod; wherein said locking mechanism comprises a fixed locking core and a rotating housing handle; wherein one end of said rod is attached to the fixed locking core; wherein said rotating housing handle has a ring-shaped base with two rings separated by an inner cavity; wherein an inner side of said ring-shaped base has several punctures; wherein said punctures are ended inside the ring-shaped base itself;

wherein said rotating housing handle has locking pins designed to be inserted into said punctures in said inner side of said ring-shaped base of the rotating housing handle; wherein said locking pins are designed to be inserted into said fixed locking core;

wherein said fixed locking core includes keyhole to which a key is designed to be inserted for opening said locking mechanisms; and whereby said rotating housing handle serves both as a rotating housing of said locking mechanism and as a handle of said quick release mechanism.

2. The quick release mechanism according to claim 1 wherein holes on said fixed locking core that are designed to receive said locking pins are located opposite to a hole-like depression to which said rod is connected.

\* \* \* \* \*